(12) United States Patent
Magazzini (10) Patent No.: US 10,865,586 B2
(45) Date of Patent: Dec. 15, 2020

(54) DOOR MODULE HAVING CARRIER WITH ELECTRIC LATCH

(71) Applicant: Magna Closures Inc., Newmarket (CA)

(72) Inventor: Mario Magazzini, Leghorn (IT)

(73) Assignee: MAGNA CLOSURES INC., Newmarket (CA)

( * ) Notice: Subject to any disclaimer, the term of this patent is extended or adjusted under 35 U.S.C. 154(b) by 92 days.

(21) Appl. No.: 15/634,248

(22) Filed: Jun. 27, 2017

(65) Prior Publication Data

US 2018/0016811 A1 Jan. 18, 2018

Related U.S. Application Data

(60) Provisional application No. 62/361,100, filed on Jul. 12, 2016.

(51) Int. Cl.
| | | |
|---|---|---|
| *E06B 3/00* | (2006.01) | |
| *E05B 17/22* | (2006.01) | |
| *B60J 5/04* | (2006.01) | |
| *B60R 16/02* | (2006.01) | |
| *E05B 81/56* | (2014.01) | |
| *E05B 83/36* | (2014.01) | |

(52) U.S. Cl.
CPC ............ *E05B 17/22* (2013.01); *B60J 5/0413* (2013.01); *B60J 5/0416* (2013.01); *B60R 16/02* (2013.01); *E05B 81/56* (2013.01); *E05B 83/36* (2013.01); *E05Y 2400/654* (2013.01); *E05Y 2400/85* (2013.01); *E05Y 2900/531* (2013.01)

(58) Field of Classification Search
CPC .......... E05B 17/22; E05B 81/56; E05B 83/36; B60J 5/0416; B60J 5/0413; B60R 16/02; E05Y 2900/531; E05Y 2400/654; E05Y 2400/85
USPC .......................................................... 49/503
See application file for complete search history.

(56) References Cited

U.S. PATENT DOCUMENTS

| | | | | |
|---|---|---|---|---|
| 7,576,631 | B1 * | 8/2009 | Bingle | ..... E05B 81/76 340/5.54 |
| 9,132,721 | B2 | 9/2015 | Fortin | |
| 9,845,623 | B1 * | 12/2017 | Gage | ........ E05B 81/76 |
| 2004/0124708 | A1 * | 7/2004 | Giehler | ........ B60R 25/246 307/10.5 |
| 2009/0160211 | A1 * | 6/2009 | Krishnan | ..... B60J 5/04 296/146.4 |
| 2011/0203336 | A1 * | 8/2011 | Mette | ..... E05B 47/0611 70/277 |
| 2014/0208656 | A1 * | 7/2014 | Fortin | ........ B60J 5/06 49/449 |

(Continued)

*Primary Examiner* — Basil S Katcheves
(74) *Attorney, Agent, or Firm* — Dickinson Wright PLLC (57) ABSTRACT

A door, a door module therefor, and a method of constructing a door for a motor vehicle is provided. The door module includes a carrier; an electrical latch secured to the carrier, and a latch control system. The latch control system has an inside micro-switch operably connected to the electrical latch via an inner electrical connector, and an outside micro-switch operably connected to the electrical latch via an outer electrical connector. Electrical communication between the electrical latch and latch control system, initiated via selective actuation of the inside and outside micro-switches, provides full normal operation of a vehicle door without need for mechanical linkages.

11 Claims, 11 Drawing Sheets

(56) References Cited

U.S. PATENT DOCUMENTS

| | | | | |
|---|---|---|---|---|
| 2014/0338409 A1* | 11/2014 | Kraus | ............... | E05B 81/76 |
| | | | | 70/278.1 |
| 2015/0059250 A1* | 3/2015 | Miu | ............... | E05F 15/611 |
| | | | | 49/349 |
| 2015/0330117 A1* | 11/2015 | Van Wiemeersch | .... | E05B 85/14 |
| | | | | 292/96 |
| 2016/0060909 A1* | 3/2016 | Krishnan | ........... | G07C 9/00182 |
| | | | | 292/194 |
| 2016/0153217 A1* | 6/2016 | Mazal | ............ | E05B 85/243 |
| | | | | 292/200 |

* cited by examiner

Results achieved with this disclosure

Deletion of following parts that are normally included in the Door BOM:

1. Movable Out-side handle and its sealings,
2. Chassis of Out-side handle,
3. screw to fix chassis to DIW,
4. O/S handle Bowden opening cable/rod,
5. Key-cylinder,
6. Rod of key-cylinder,
7. anti-theft protection for rod,
8. chassis presenter,
9. I/S release handle,
10. I/S release Bowden cable/rod.

11. Reduction of:
12. total door assembly time
13. total door weight (several kg/car less)
14. total cost.

15. Style:
    - Increased freedom for style choices
    - Lower ergonomics constrain

- DIW production
    - Easier DIW stamping

FIG. 12

DOOR MODULE HAVING CARRIER WITH ELECTRIC LATCH

CROSS-REFERENCE TO RELATED APPLICATION

This application claims the benefit of U.S. Provisional Application Ser. No. 62/361,100, filed Jul. 12, 2016, which is incorporated herein by reference in its entirety.

FIELD

The present disclosure relates generally to vehicle doors and door modules for vehicle doors and, more particularly, to a door module for vehicle doors configured and adapted to interact with a fully electrical-actuated latch assembly.

BACKGROUND

This section provides background information related to vehicle doors and door modules to provide a better understanding of currently available configurations and adaptations of such vehicle doors and door modules. However, the information provided in this section is not necessarily considered to be prior art with respect to the inventive concepts associated with the present disclosure.

A motor vehicle door typically includes a structural door body having an outer sheet metal door panel and an inner sheet metal door panel, a plurality of hardware components mounted within an internal cavity formed in the structural door body between the inner and outer door panels, and an interior trim panel. The complete assembly of the door involves multiple manufacturing steps and numerous parts. Conventionally, an original equipment manufacturer (OEM) was required to install each individual hardware component and the trim panel to the structural door body as it travelled along an assembly line. This conventional installation process had several drawbacks. First, high assembly cycle times were required to assemble the vehicle door since installation of each hardware component was required. Second, the operability of the hardware components could not be tested until the installation and assembly process was completed. Third, each hardware component had to be inventoried and managed at the OEM assembly facility.

To address these concerns, many modern vehicle doors now include a door module having a carrier onto which most of the hardware components (both mechanical and electrical) are pre-assembled. Once assembled onto the carrier, the operability of the hardware components can be tested prior to installing the door module into the structural door body. Thereafter, the door module is installed within the internal cavity of the structural door body. An example of a conventional door module is disclosed in U.S. Pat. No. 9,132,721. Some of the mechanical and electrical hardware components and assemblies commonly associated with conventional pre-assembled door modules can include, without limitation, the latch assembly, the outside door handle and its mechanical connections (O/S release Bowden cable and/or rods) to the latch assembly, the key cylinder and its related mechanical connectors to the latch assembly, the anti-theft device, the chassis presenter, the inside door handle and its mechanical connections (I/S release Bowden cable and/or rods) to the latch assembly, and a window regulator unit. In many higher-end vehicles the latch assembly and the window regulator unit are equipped with a powered actuator, such as an electric motor, which are electrically connected to a controller via wiring harnesses.

In view of the above, pre-assembled door modules have proven to provide a successful alternative to the conventional OEM door assembly processing. However, door modules can become quite heavy and complicated. Further, advances in electrically-actuated door latch assemblies equipped with motor-driven power release and cinch functionality have further complicated the design of door modules since mechanical back-up systems are still typically provided. In view of the continued development of fully electrical latches, referred to as e-latches, some of the mechanical linkages to the inside and outside door handles have been eliminated since the latch is released by energization of a powered release actuator in response to an electrical signal from the handle or a fob associated with a passive entry system.

Thus, a need exists to develop optimized door modules configured and operable in association with a fully electrical latch assembly.

SUMMARY

This section provides a general summary of some of the objects, advantages, aspects and features provided by the inventive concepts associated with the present disclosure. However, this section is not intended to be considered an exhaustive and comprehensive listing of all such objects, advantages, aspects and features of the present disclosure.

In one aspect, the present disclosure is directed to a vehicle door and a door module for the vehicle door which advances the art and improves upon currently known vehicle doors and door modules for such vehicle doors.

It is a related aspect to provide a door module equipped with a fully electrical latch that eliminates one or more of the mechanical release connections between one or more of the inside handle release mechanism and the outside handle release mechanism.

In accordance with another aspect of the disclosure, a door for a motor vehicle is provided. The door includes a structural door body defining an internal cavity and a door module installed within the internal cavity. The door module can include a carrier secured to the structural door and an electrical latch secured to the carrier. The door module further includes a latch control system having an inside micro-switch mounted to an inner portion of the door body so as to be located within a passenger compartment of the motor vehicle, an inner electrical connector electrically connecting the inside micro-switch to the electrical latch, an outside micro-switch mounted to an outer portion of the door body so as to be located outside of the passenger compartment, and an outer electrical connector electrically connecting the outside micro-switch to the electrical latch.

In accordance with another aspect of the disclosure, the inside micro-switch of the door can be positioned on an interior trim panel of the door.

In accordance with another aspect of the disclosure, the outside micro-switch of the door can be located on an outside door handle.

In accordance with another aspect of the disclosure, the outside door handle of the door can be free of any mechanical connections to the fully electrically actuatable latch.

In accordance with another aspect of the disclosure, the inner and outer electrical connectors can be provided as electrical wires, thereby being able to be freely routed over meandering or straight paths, as desired, thus, providing great freedom for the design configuration of the door.

In accordance with another aspect of the disclosure, the electrical latch can be free of any mechanical connections thereto, thereby being fully electrically actuatable.

In accordance with another aspect of the disclosure the door can be free of mechanically actuatable inside and outside door handles, thereby greatly simplifying assembly, reducing the number of components needed for assembly, reducing costs associated with inventory and assembly, reducing weight, and freeing up space for desired design modifications.

In accordance with another aspect of the disclosure, a door module for a motor vehicle closure panel is provided. The door module includes a carrier; an electrical latch secured to the carrier, and a latch control system. The latch control system has an inside micro-switch operably connected to the electrical latch via an inner electrical connector, and an outside micro-switch operably connected to the electrical latch via an outer electrical connector.

In accordance with another aspect of the disclosure, a method of constructing a door for a motor vehicle is provided. The method includes providing a structural door body defining an internal cavity; installing a door module, including a carrier and an electrical latch secured thereto, within the internal cavity. Further, mounting an inside micro-switch to an inner portion of the door body so as to be located within a passenger compartment of the motor vehicle, and electrically connecting the inside micro-switch to the electrical latch. Further, mounting an outside micro-switch to an outer portion of the door body so as to be located outside of the passenger compartment, and electrically connecting the outside micro-switch to the electrical latch.

In accordance with another aspect of the disclosure, the method can further include locating the outside micro-switch on an outside door handle.

In accordance with another aspect of the disclosure, the method can further include providing the outside door handle being free of any mechanical connections thereto.

In accordance with another aspect of the disclosure, the method can further include leaving the electrical latch free of any mechanical connections thereto.

In accordance with another aspect of the disclosure, the method can further include leaving the door free of mechanically actuatable inside and outside door handles.

These and further areas of applicability will become apparent to those possessing ordinary skill in the art from the description provided herein. As noted, the description and any specific examples in this summary are intended for purposes of illustration only and are not intended to limit the scope of the present disclosure.

DRAWINGS

The drawings described herein are for illustrative purposes only of selected embodiments and include.

DETAILED DESCRIPTION

The example embodiments will now be described more fully with reference to the accompanying drawings.

One or more example embodiments of a door module for a vehicle door are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
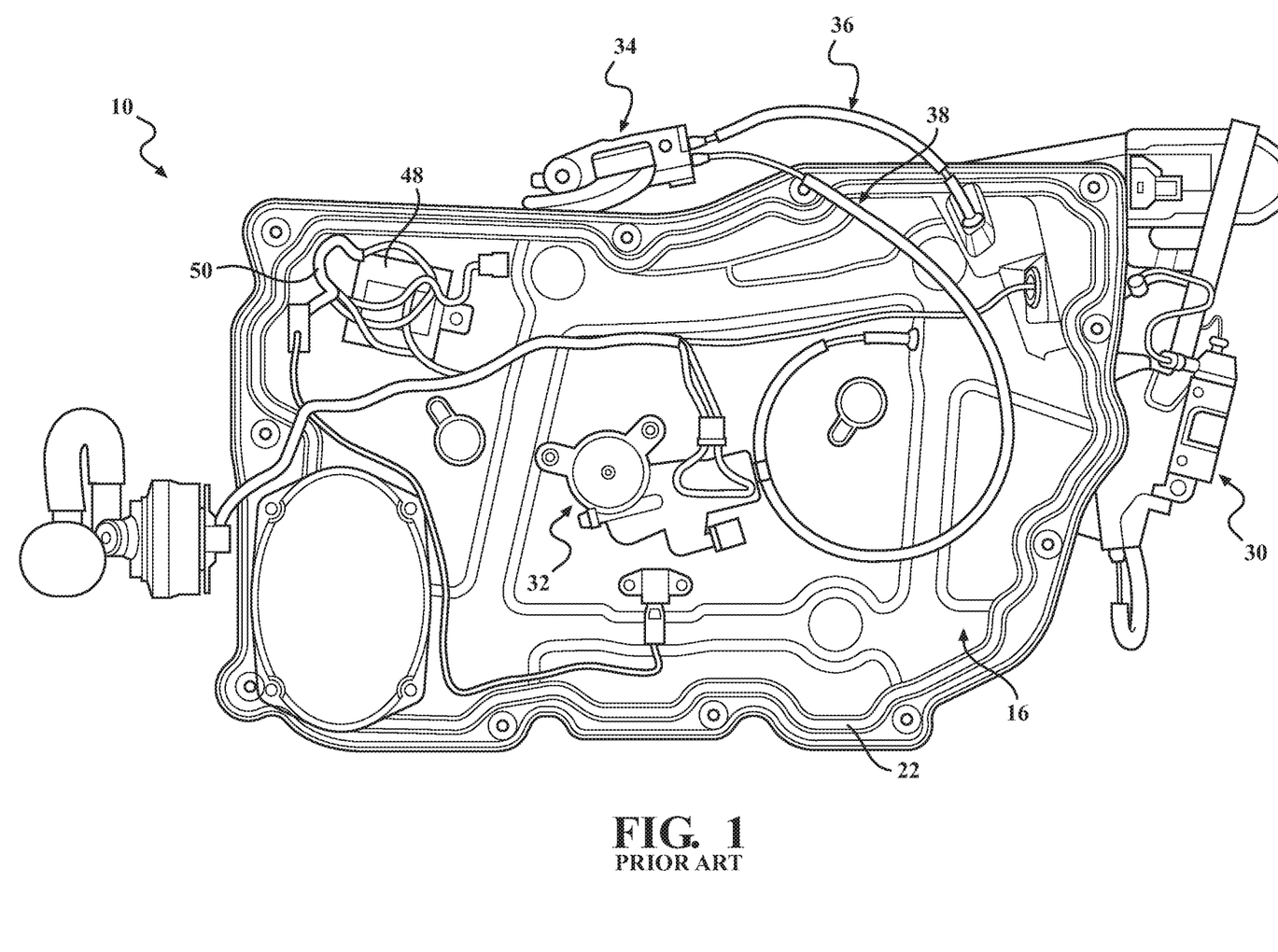
FIG. 1 is a plan view of a first side of a conventional door module in accordance with the prior art.
Figure 2:
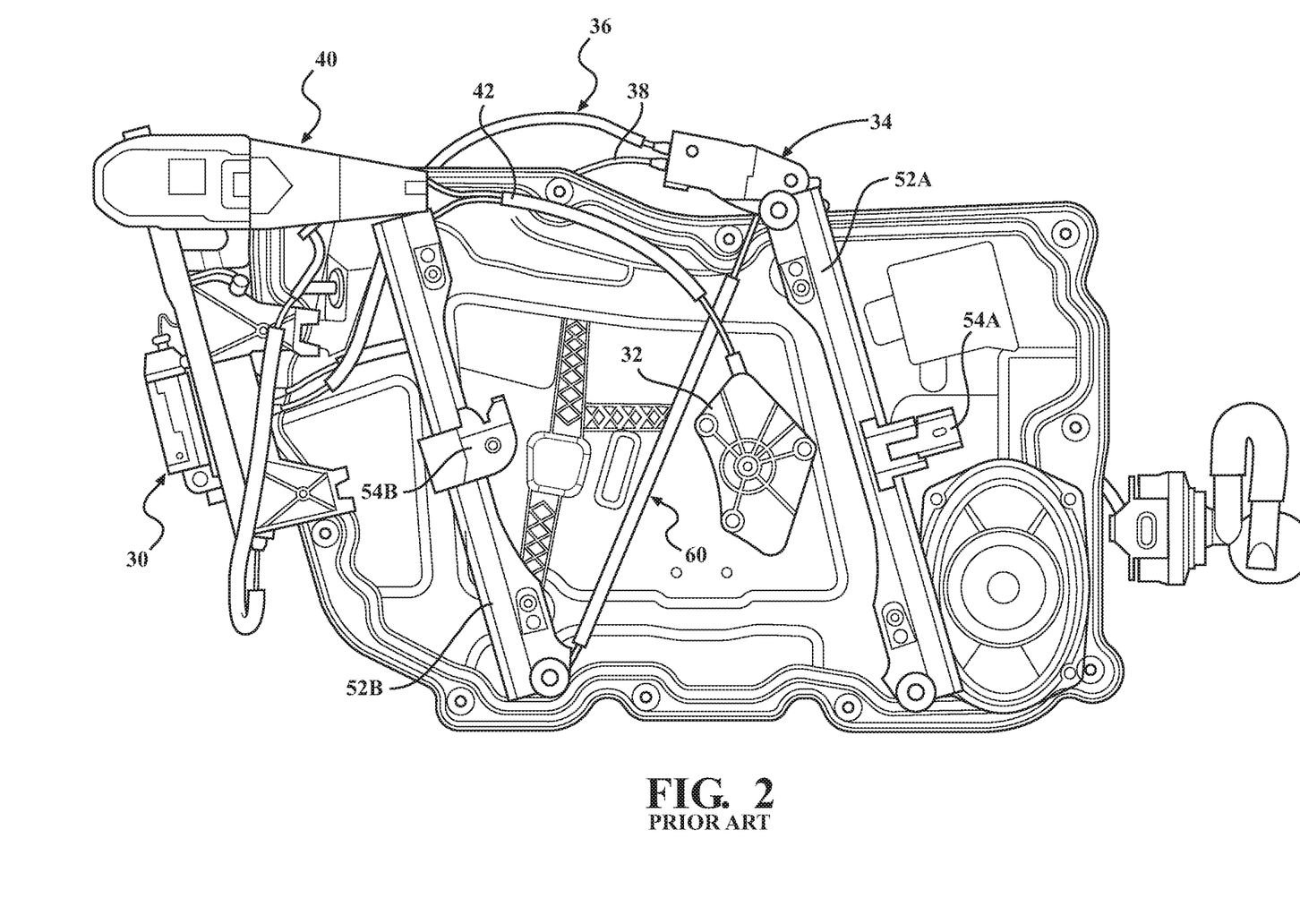
FIG. 2 is a plan view of a second side of the conventional door module of FIG. 1.
Figure 3:
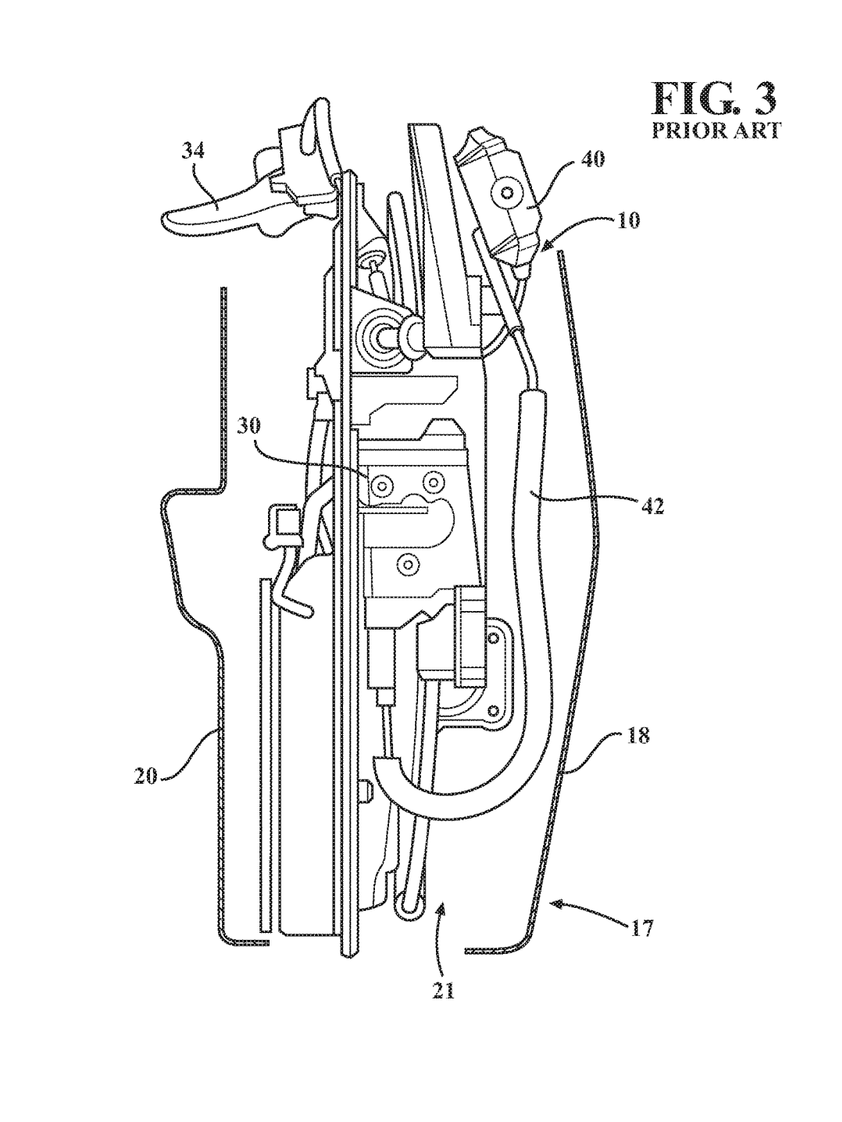
FIG. 3 is an end view of the conventional door module.
Figure 4:
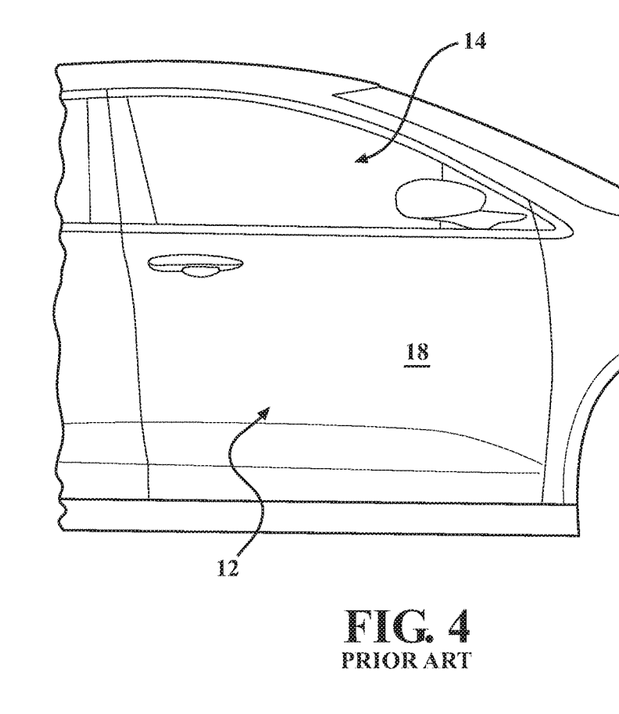
FIG. 4 is a view of a vehicle door installed with the conventional door module shown in FIGS. 1-3.

FIG. 1 shows a first side of a conventional door module 10, FIG. 2 shows an opposite second side of door module 10, and FIG. 3 shows an end view of door module 10. The first side of door module 10 shown in FIG. 1 is referred to as the "dry side" because, when door module 10 is installed in a vehicle door 12, door module 10 seals the passenger compartment of the motor vehicle against the outside ambient environment such that the first side, which faces toward the interior passenger compartment, is protected from the outside environment and remains dry. In contrast, the second side of door module shown in FIG. 2 is referred to as the "wet side" because, when door module 10 is installed in vehicle 12, the second side faces outwardly toward the outside environment, away from the interior passenger compartment, and may be exposed to the outside ambient environment as a result of apertures in vehicle door 12 (such as the large slot through which a window 14 moves between open and closed positions).

Door module 10 is shown to include a carrier 16, which is generally plate-like in configuration, although carrier 16 has a variety of integrally formed three-dimensional features. Carrier 16 holds a variety of functional door hardware components. Carrier 16 is preferably a structural component in the sense that the door hardware components may be mounted thereto without requiring additional fasteners to mount the components to the structural door 12 after installation of door module 10 therein. As is understood, door 12 includes a structural door body 17 made up of an inner sheet metal door panel 20 joined to an outer sheet metal door panel 18 along their peripherals so as to define an internal door cavity 21 between the inner and outer door panels. Inner door panel 20 is schematically shown in FIG. 3 via a silhouette line. Window 14 is stored in door cavity 21 when moved to its opened position. Inner door panel 20 typically includes an aperture (not shown) configured to provide access to internal door cavity 21 and which is ultimately covered via the trim panel. Carrier 16 includes a circumferential sealing bead 22 on the wet side which is configured to surround the aperture in inner door panel 20 when carrier 16 is mounted against inner door panel 20. Since carrier 16 is impervious to water, the sealing bead 22 acts to prevent infiltration of moisture into the passenger cabin.

The conventional door module 10 is shown carrying most, if not all, of the door hardware components for vehicle door 12. Generally speaking, the functional hardware components secured to carrier 16 can, as shown, include a power-operated latch assembly 30, a power-operated window regulator 32, an inside handle unit 34 mechanically coupled to latch assembly 30 via an inside release mechanism 36 and via an inside lock/unlock mechanism 38, and an outside handle unit 40 mechanically coupled to latch assembly 30 via an outside release mechanism 42. The connector mechanisms can be Bowden cables and/or rod-links, as is known. The functional hardware components are electrically coupled to an ECU 48 via a wiring harness 50. Carrier 16 further supports a pair of guide rails 52A, 52B which support corresponding lift brackets 54A, 54B for translational movement thereon. Lift brackets 54A, 54B support window 14 for movement along rails 52A, 52B between its opened and closed positions. A cable and pulley-type window lift system 60 connects lift brackets 54A, 54B to a drum associated with power-operated window regulator 32. Thus, FIGS. 1-3 illustrate the complexity typically associated with a conventional door module 10.

Figure 5:
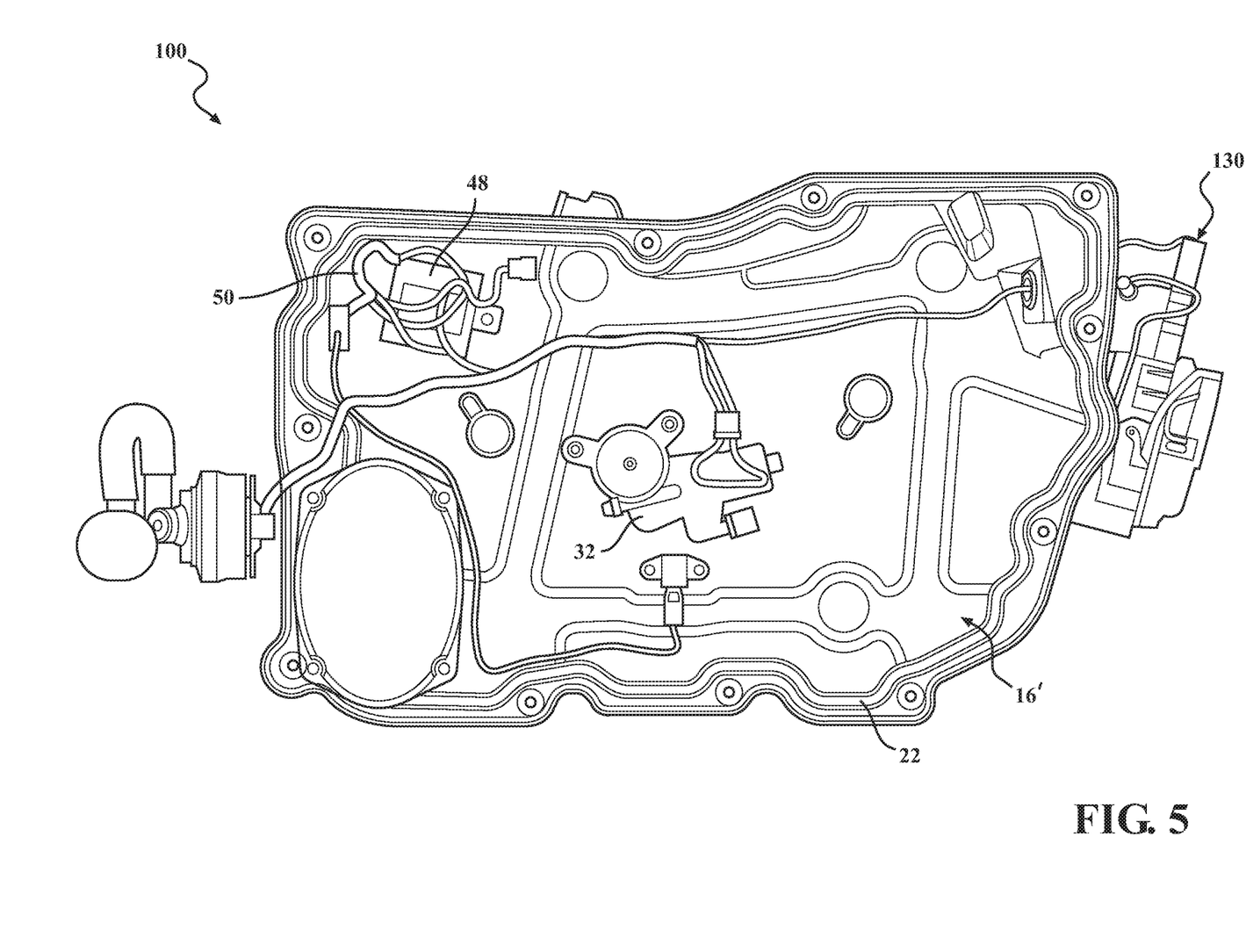
FIG. 5 is a plan view of a first side of a door module configured and constructed in accordance with the present disclosure.
Figure 6:
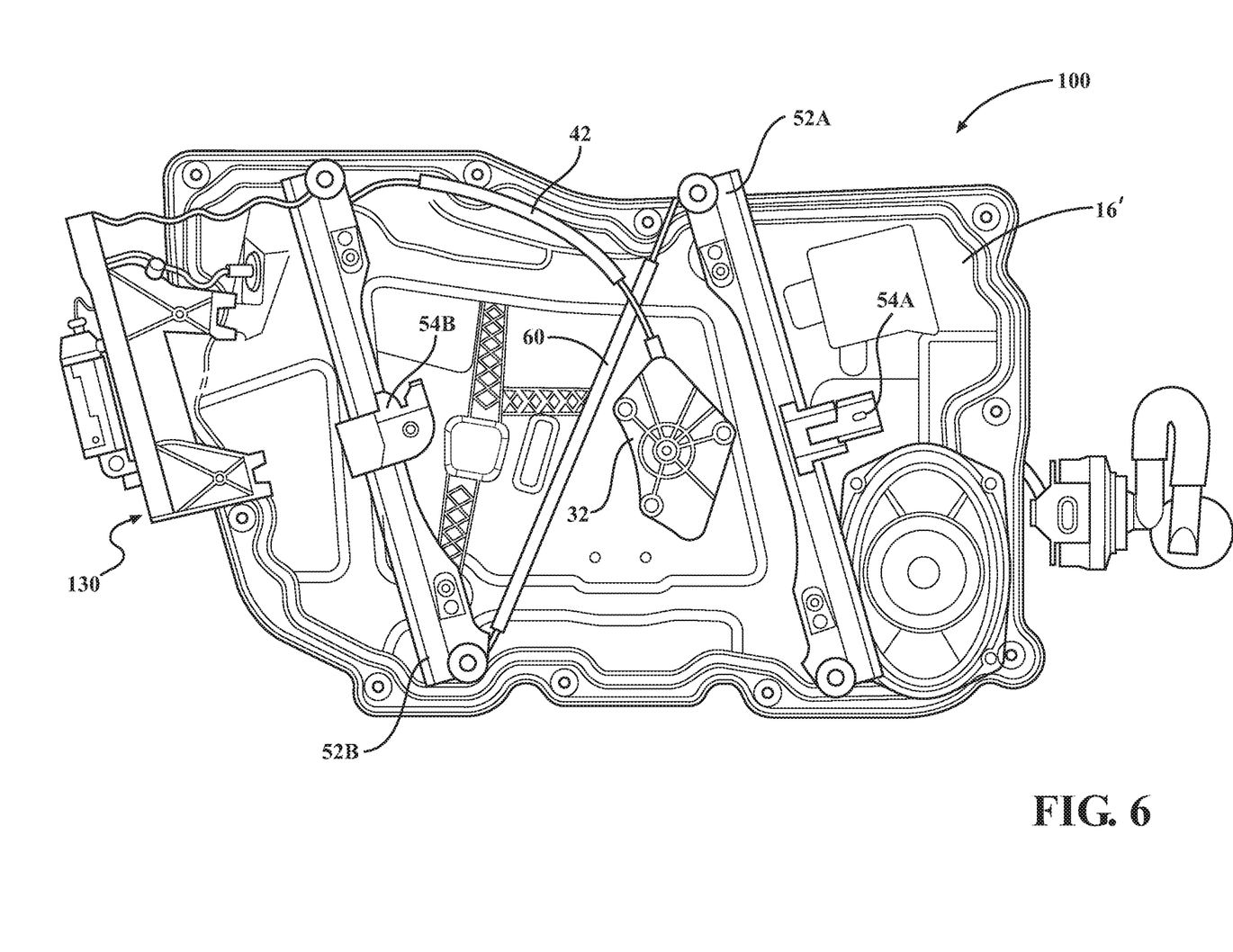
FIG. 6 is a plan view of a second side of the door module shown in FIG. 5.
Figure 7:
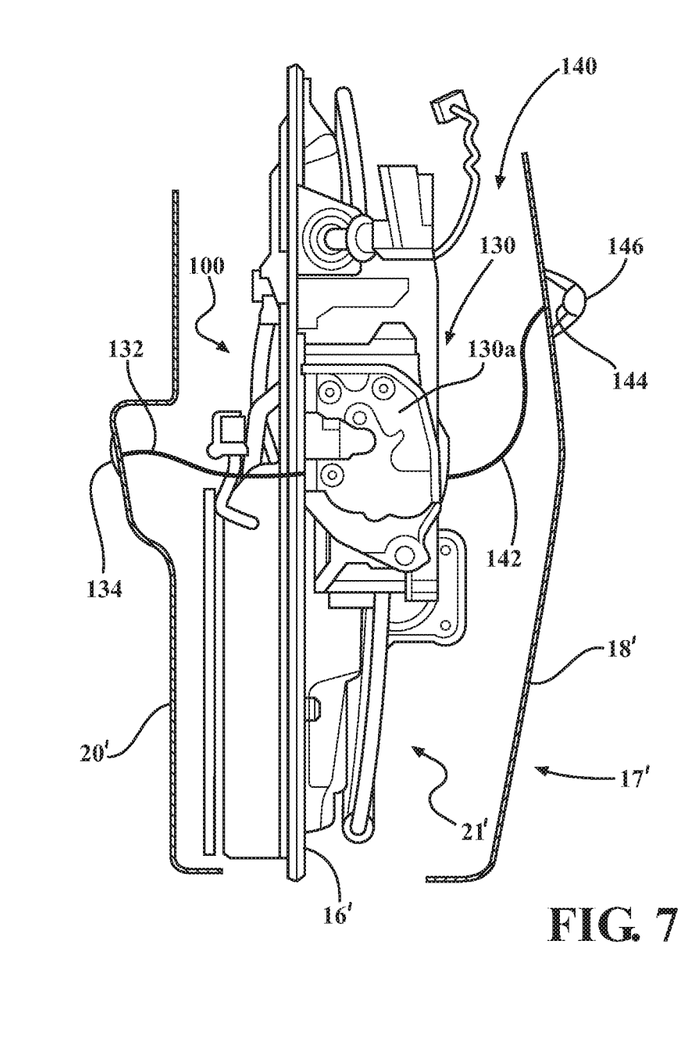
FIG. 7 is an end view of the door module shown in FIGS. 5 and 6.
Figure 8:
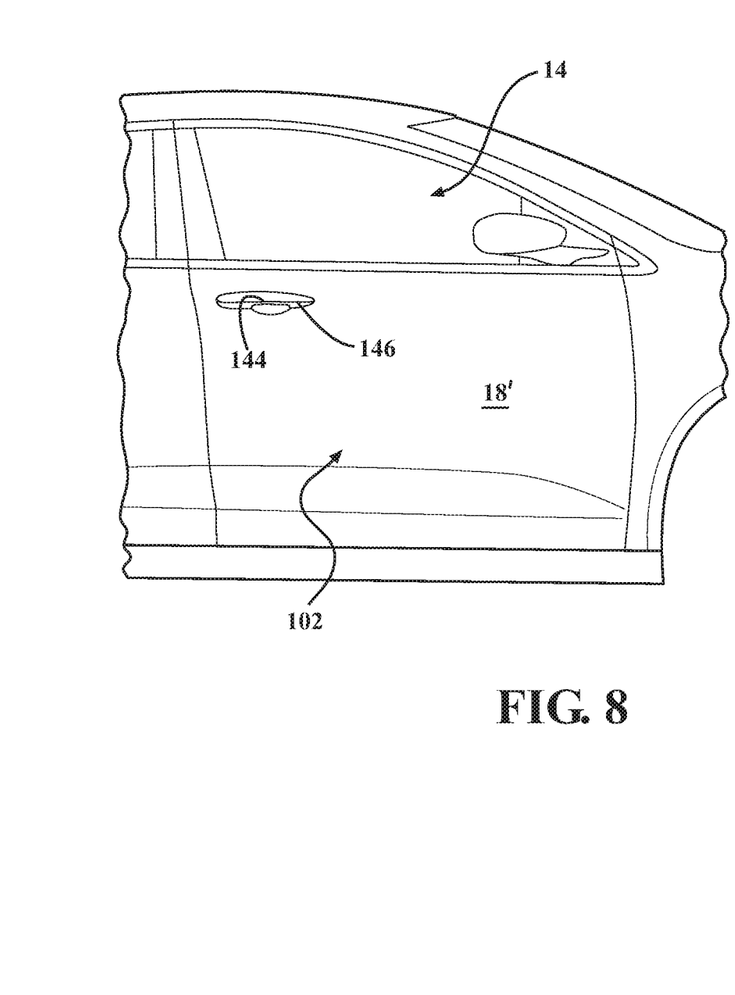
FIG. 8 is a view of a vehicle door equipped with the door module shown in FIGS. 5-7.
Figure 10:
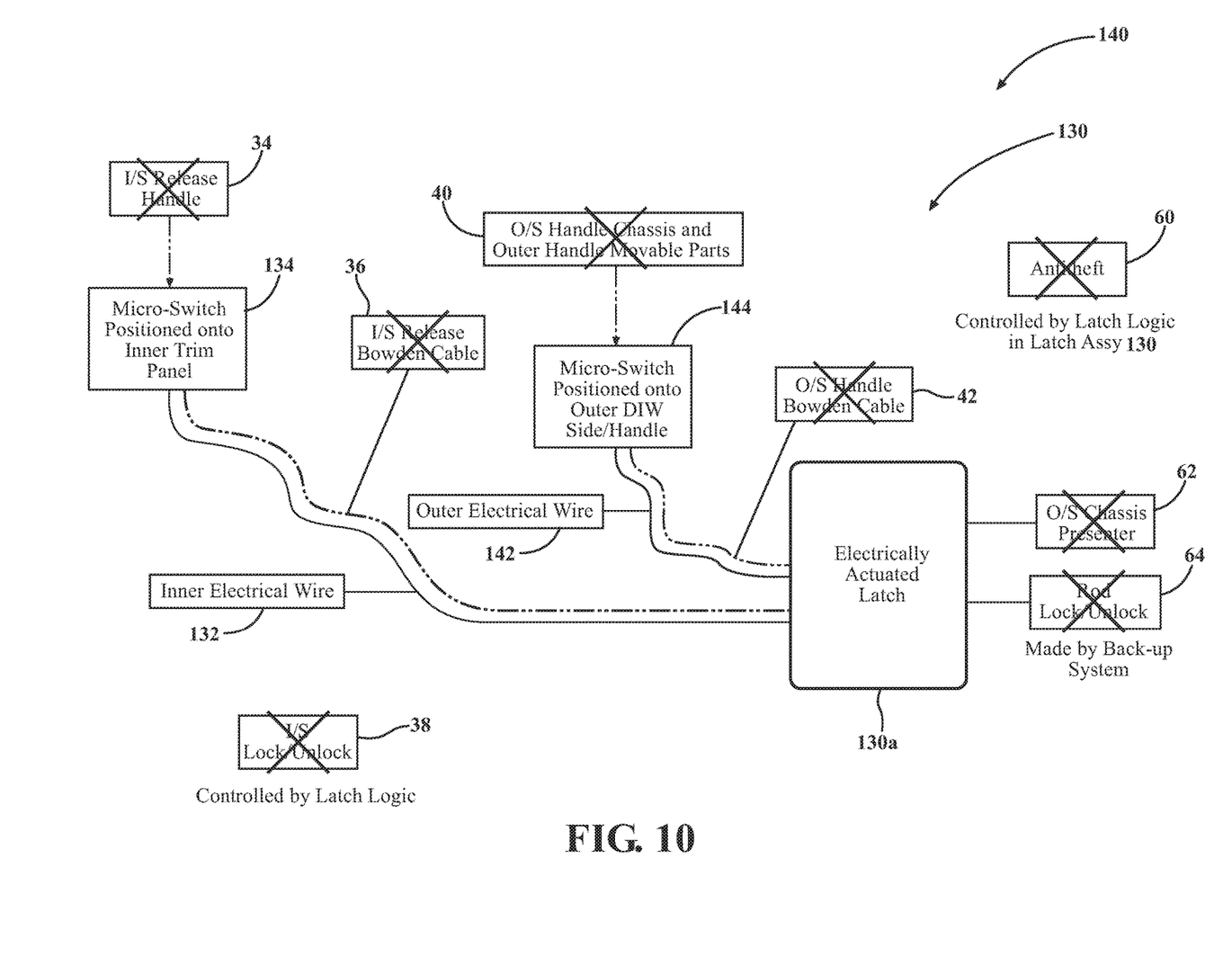
FIG. 10 is an actuation scheme associated with the door module of the present disclosure and further illustrating the components and/or sub-assemblies eliminated in comparison to the conventional door module.
Figures 11A, 11B:
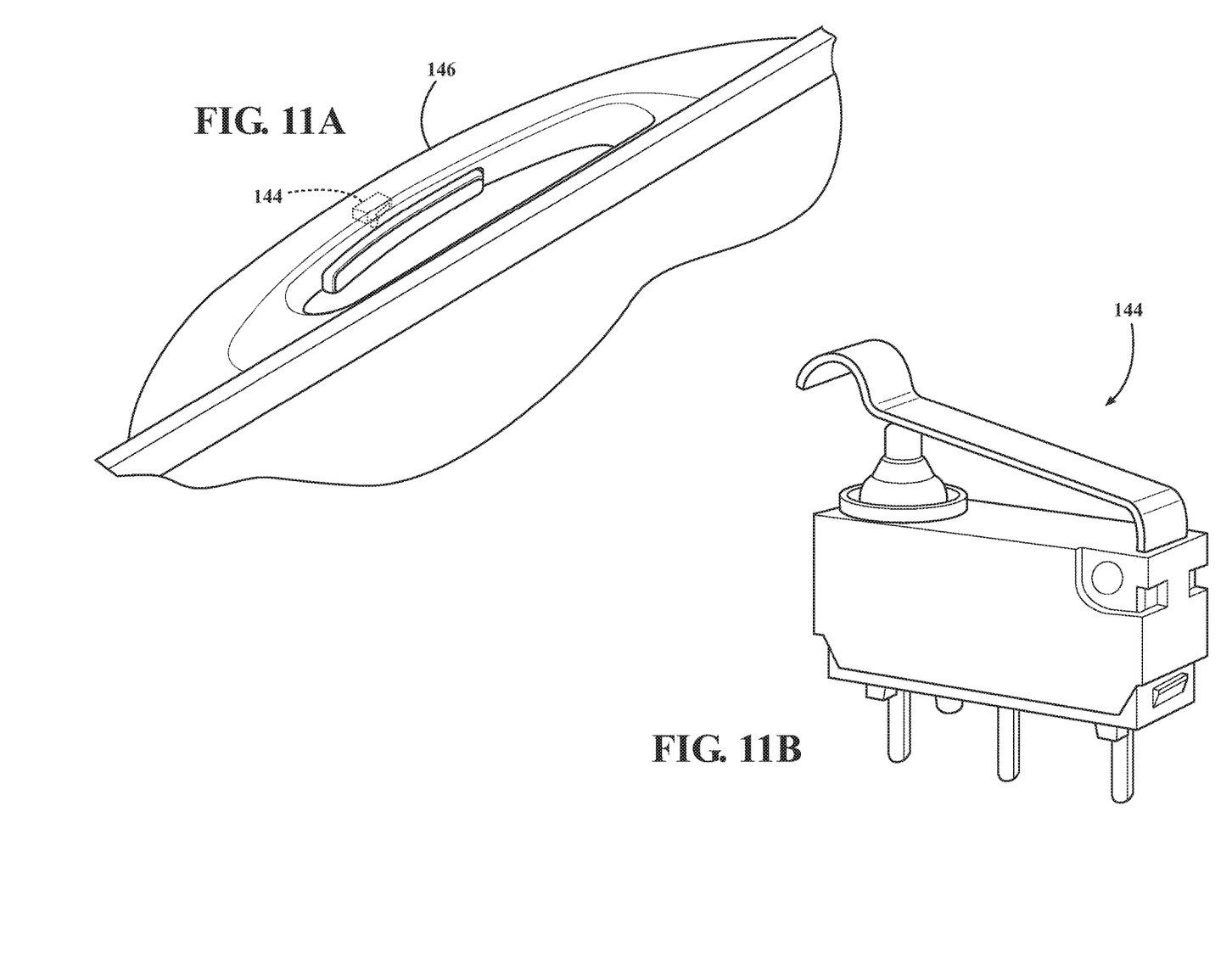
FIG. 11A illustrates the location of an outside handle switch on the vehicle door installed with the door module of the present disclosure.
FIG. 11B illustrates the outside handle switch of FIG. 11A.

As an improvement over conventional door module 10, the present disclosure provides an optimized door module 100 as shown in FIGS. 5-7 for use in door 102 of FIG. 8 which is equipped with a fully-electrical latch assembly 130, referred to as "Smart Latch", including an electric latch 130a secured to a carrier 16' of the module 100. Door 102, other than with respect to the optimized door module 100, is generally similar to the door 12, thus, door 102 includes a structural door body 17' made up of an inner sheet metal door panel 20' joined to an outer sheet metal door panel 18' along their peripherals so as to define an internal door cavity 21' between the inner and outer door panels 20', 18'. Smart Latch 130 is configured not to have mechanical linkages and/or mechanical connector mechanisms to the outside and inside door handles of door 102. Instead, door 102 is unlocked and released by the electrically commanded, power-operated actuator(s) associated with Smart Latch 130 in response to an electrical signal coming from a latch control system 140 of Smart Latch 130. By providing an electrically commanded operation of the Smart Latch 130, the openings, through-holes, or like interfaces typically present in the conventional door module 10 for accommodating the passage of mechanical linkages and/or mechanical connector mechanisms, or other connector types, between the wet side and the dry side of the door module 100 can be reduced and/or eliminated, thereby also providing for enhanced sealing of the door module 100 with less likelihood of water ingress there between. FIG. 10 schematically illustrates the latch control system 140 and electric latch 130a of Smart Latch 130. The latch control system 140 includes an inside micro-switch 134 and an outside micro-switch 144, both of which are configured in electrical communication with the electric latch 130a for selective actuation thereof. As shown the electric latch 130a is connected via an inner electrical connector, such as an inner electrical wire 132, by way of example, to the inside micro-switch 134. The inside micro-switch 134 can be mounted to an inner portion of the door body 17' so as to be located within a passenger compartment of the motor vehicle, such as being positioned on the trim panel or another surface of door 102 within the passenger compartment. As such, the inside micro-switch 134 can be selectively activated to selectively actuate the electrical latch 130a. The inside micro-switch 134 could be placed on an inside door handle, if desired and if provided, though the inside door handle would not be mechanically connected to the Smart Latch 130 for normal operation, but could be, optionally, for emergency situations, if desired. Similarly, electric latch 130a is also connected via an outer electrical connector, such as an outer electrical wire 142, by way of example, to the outside micro-switch 144 located on outside handle 146 (FIG. 11) or another surface on the outer door panel of door 102, such that the outside micro-switch 144 can be selectively activated to selectively actuate the electrical latch 130a. If on an outside door handle 146, the outside door handle 146 would not be mechanically connected to the Smart Latch 130 for normal operation, but could be, optionally, for emergency situations, if desired. Accordingly, it is to be recognized that inner and outer door handles would serve primarily as locations for pulling and pushing the door open and closed, and not as mechanical mechanisms or actuators for mechanically unlatching the electric latch 130a. One non-limiting example of an electric latch 130a is disclosed both structurally and operationally in commonly-owned U.S. Pat. No. 9,353,556 and is considered to be incorporated herein by reference. FIG. 10 further illustrates the door hardware components associated with conventional door module 10 that can be eliminated, shown as being crossed-out, based on the inventive concepts provided by optimized door module 100 with Smart Latch 130.

Figure 9A:
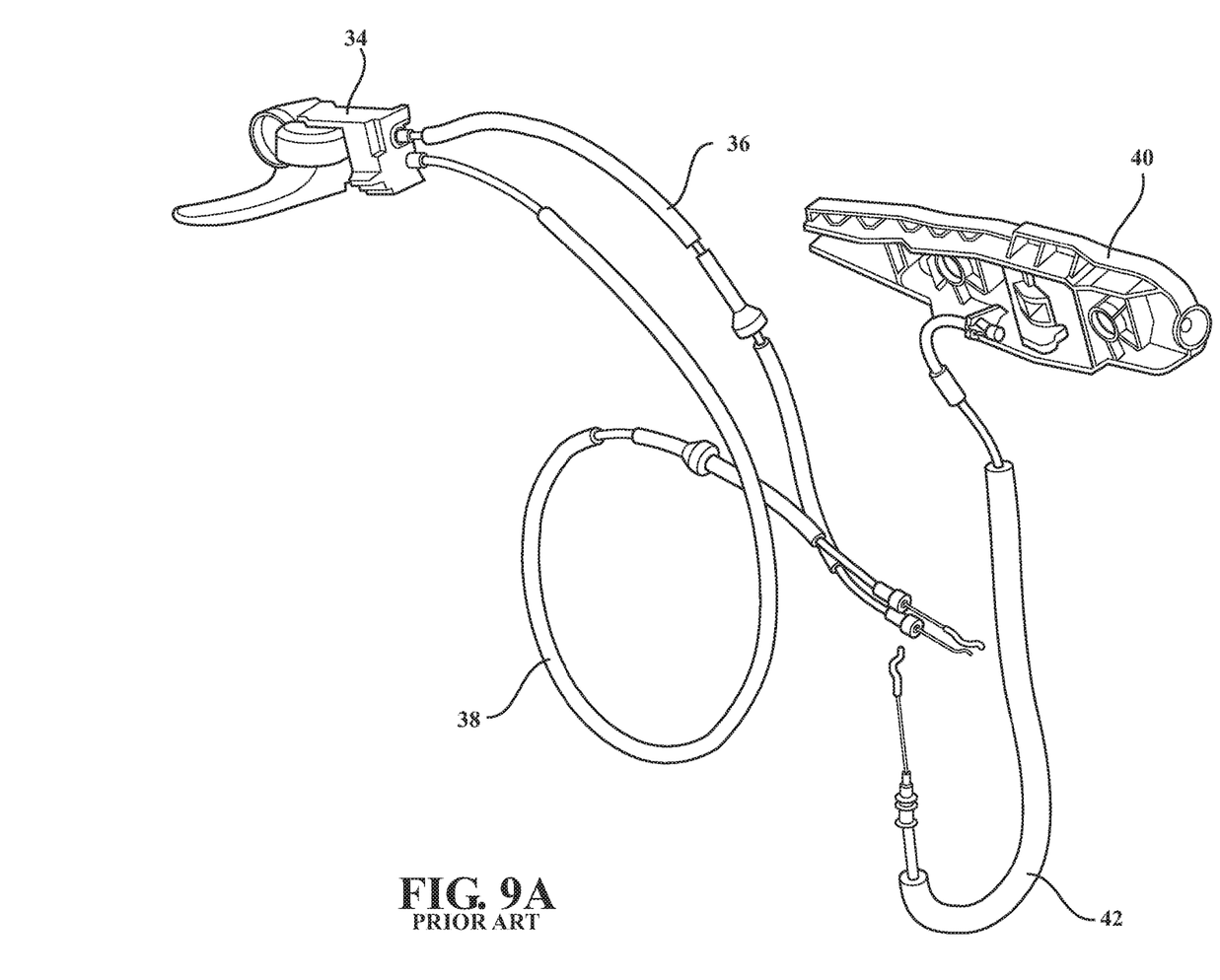
FIGS. 9A and 9B illustrate some of the prior art hardware components and/or sub-assemblies eliminated from the door module of the present disclosure when compared to the conventional door module of the prior art.
Figure 9B:
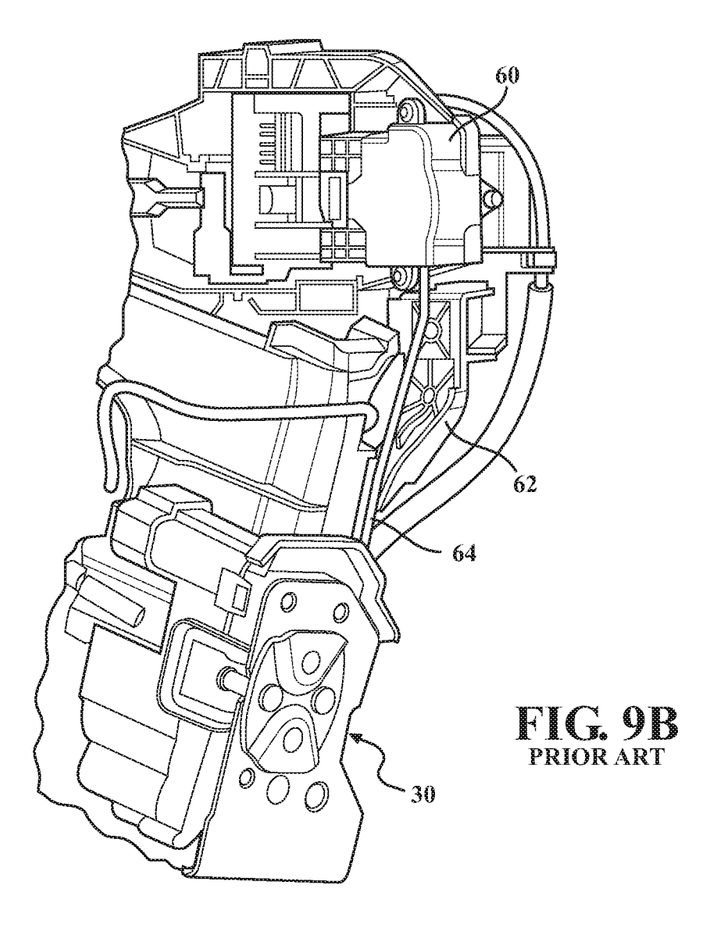

As noted, the inside lock/unlock mechanism 38 of door module 10 is now provided by and controlled via logic associated with Smart Latch 130. Likewise, an anti-theft mechanism 60, a chassis presenter 62 and a rod lock/unlock mechanism 64 associated with the power-operated latch assembly 30 (FIG. 9B) can also be eliminated, with the features/functions of anti-theft mechanism 60 provided by and controlled via logic associated with Smart Latch 130.

Figure 12:
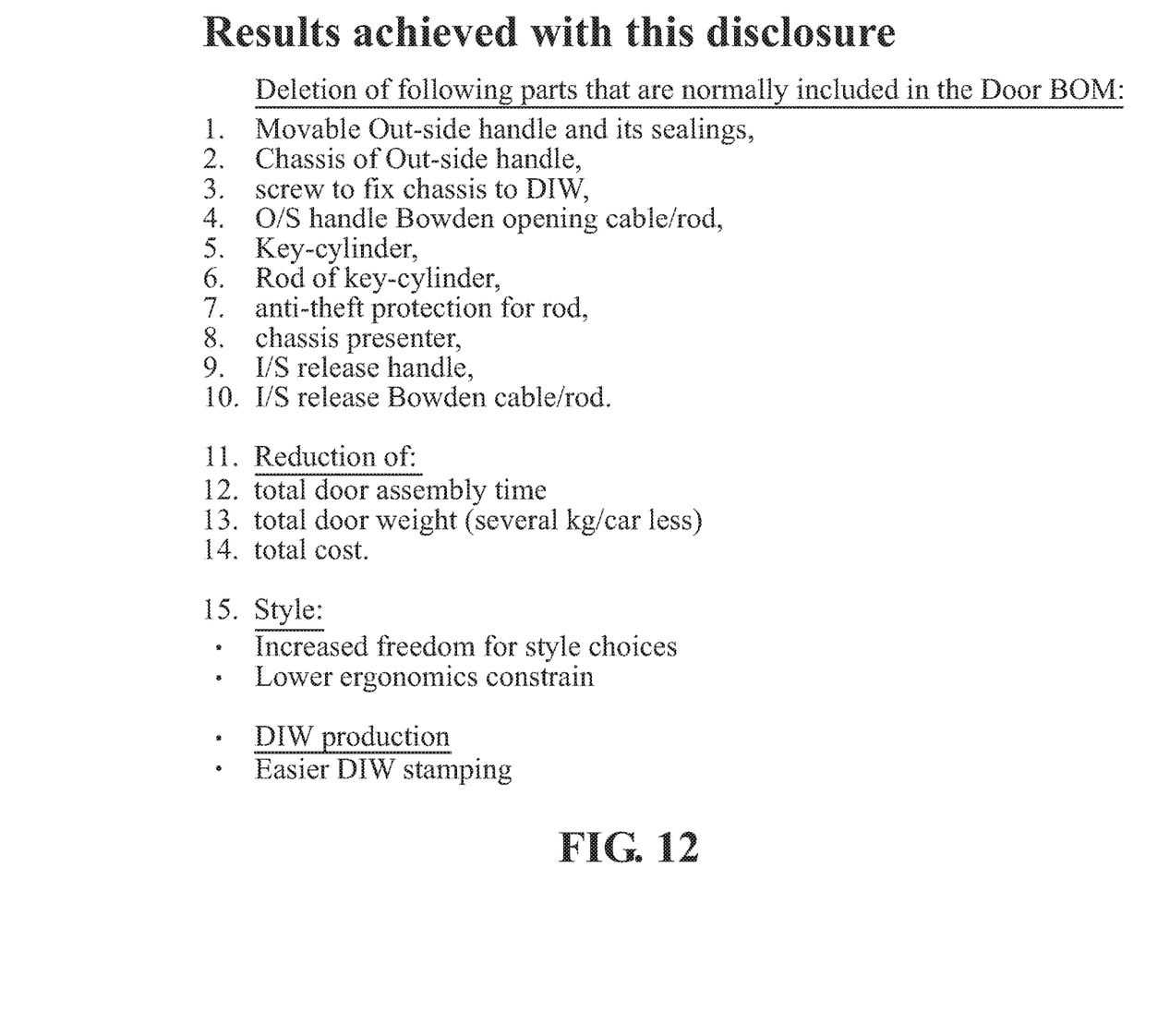
FIG. 12 is a list of the results associated with the door module of the present disclosure.

Door module 100 provides significant advantages over conventional door module 10, including weight reduction, assembly reduction (number of separate components needed and time for assembly significant reduced), cost reduction as well as new styling opportunities presented by unused space as a result of deletion of some conventional door hardware components. FIG. 12 is a table listing the door hardware components of conventional door module 10 that are no longer required since door module 100 is now equipped with Smart Latch 130 and the electrically connected inner and outer micro-switches.

In summary, the adaptation of Smart Latch 130 (or any similar fully electrical latch assembly) into the stand-alone structural door module 100 avoids/eliminates the requirements of having any kind of mechanical connections with the opening interfaces (i.e. the inside and outside door handles) for normal operation. The unlock/lock and opening commands are input via wired electrical connections.

As an alternative to door module 100, as briefly mentioned above, it is optionally possible to provide an accessible, but less visible, back-up mechanical system to address possible electrical malfunctions or damage to the vehicle, such as may result in an accident or otherwise. This optional mechanical back-up system can be associated with the inside release function on one or more of the vehicle doors. A further optional alternative is to provide the less visible mechanical back-up release system in association with an outside release function on one or more of the vehicle doors. Obviously, any combination of the recessed, less visible, mechanical back-up systems and doors is possible.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A door for a motor vehicle, comprising:
a structural door body defining an internal cavity;
a door module installed within the internal cavity, the door module including a carrier secured to the structural door and an electrical latch secured to the carrier and free of any external mechanical connections for actuating release of the electrical latch; and
a latch control system having an inside micro-switch mounted to an inner portion of the door body so as to be located within a passenger compartment of the motor vehicle, an inner electrical connector electrically connecting the inside micro-switch to an electronic control unit within the electrical latch, an outside micro-switch mounted to an outer portion of the door body so as to be located outside of the passenger compartment, and an outer electrical connector electrically connecting the outside micro-switch to the electronic control unit within the electrical latch.

2. The door of claim 1, wherein the inside micro-switch is positioned on an interior trim panel.

3. The door of claim 1, wherein the outside micro-switch is located on an outside door handle.

4. The door of claim 3, wherein the outside door handle is free of any mechanical connections to said electrical latch.

5. The door of claim 1, wherein the inner and outer electrical connectors are electrical wires.

6. The door of claim 1, wherein the door is free of mechanically actuatable inside and outside door handles.

7. The door of claim 1, wherein the inner electrical connector electrically connects the inside micro-switch directly to the electronic control unit within the electrical latch and the outer electrical connector electrically connects the outside micro-switch directly to the electronic control unit within the electrical latch.

8. The door of claim 1, wherein no mechanical connections are coupled between the electrical latch and an inside door handle and an outside door handle and a key cylinder and a mechanical back-up system.

9. The door of claim 1, wherein the electrical latch is free of any mechanical backup connections thereto.

10. The door of claim 1, wherein only electrical wires are coupled to the electrical latch.

11. The door of claim 1, wherein the inside micro-switch and the outside micro-switch are directly connected to the electrical latch with electrical wires routed only within the door.

* * * * *